(12) United States Patent
Kreidler (10) Patent No.: US 9,653,951 B2
(45) Date of Patent: May 16, 2017

(54) INSULATION MEMBER FOR USE WITH A STATOR ASSEMBLY AND METHOD OF ASSEMBLING THE STATOR ASSEMBLY

(75) Inventor: Jason Jon Kreidler, Sheboygan Falls, WI (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 1087 days.

(21) Appl. No.: 13/569,044

(22) Filed: Aug. 7, 2012

(65) Prior Publication Data

US 2013/0270959 A1 Oct. 17, 2013

Related U.S. Application Data

(60) Provisional application No. 61/624,051, filed on Apr. 13, 2012.

(51) Int. Cl.
| | | |
|---|---|---|
| H02K 3/34 | (2006.01) | |
| H02K 23/42 | (2006.01) | |
| H02K 19/14 | (2006.01) | |
| H02K 3/487 | (2006.01) | |
| H02K 1/14 | (2006.01) | |
| H02K 3/52 | (2006.01) | |

(52) U.S. Cl.
CPC ............. *H02K 1/148* (2013.01); *H02K 3/522* (2013.01); *H02K 2213/03* (2013.01); *Y10T 29/49009* (2015.01); *Y10T 29/5192* (2015.01)

(58) Field of Classification Search
CPC ................................. H02K 3/34; H02K 15/10
USPC ..................... 310/187, 211, 215, 214; 29/596
See application file for complete search history.

(56) References Cited

U.S. PATENT DOCUMENTS

| | | | |
|---|---|---|---|
| 3,909,902 A | * | 10/1975 | Peters .......................... 29/564.6 |
| 4,389,584 A | * | 6/1983 | Burns .............................. 310/43 |
| 5,306,976 A | | 4/1994 | Beckman |
| 6,002,190 A | | 12/1999 | Kieffer |
| 6,018,207 A | | 1/2000 | Saban et al. |
| 6,163,949 A | | 12/2000 | Neuenschwander |
| 6,192,575 B1 | | 2/2001 | Neuenschwander |
| 6,509,665 B1 | | 1/2003 | Nishiyama et al. |
| 6,523,247 B2 | | 2/2003 | Mirpuri et al. |
| 6,744,166 B2 | | 6/2004 | Harter et al. |
| 6,847,285 B2 | | 1/2005 | Sirois et al. |

(Continued)

FOREIGN PATENT DOCUMENTS

| | | |
|---|---|---|
| CN | 201153223 Y | 11/2008 |
| CN | 201360206 Y | 12/2009 |

(Continued)

OTHER PUBLICATIONS

China First Office Action for related application 201310296255.2 dated Jul. 6, 2016; 12 pp.

(Continued)

*Primary Examiner* — Jose Gonzalez Quinone
(74) *Attorney, Agent, or Firm* — Armstrong Teasdale LLP (57) ABSTRACT

An insulation member for use with a stator assembly is provided. The insulation member includes a body and a cuff. The body includes a first end and an opposite second end, at least one tooth portion, and at least one yoke portion that extends from the at least one tooth portion. The cuff is formed from at least one of the first end and the second end of the body and extends along at least one of the at least one tooth portion and at least one yoke portion.

16 Claims, 8 Drawing Sheets

(56) References Cited

U.S. PATENT DOCUMENTS

| | | |
|---|---|---|
| 6,984,913 B2 | 1/2006 | Neuenschwander |
| 7,062,841 B2 | 6/2006 | Neuenschwander |
| 7,086,317 B2 | 8/2006 | Bender |
| 7,111,380 B2 | 9/2006 | Sheeran et al. |
| 7,382,075 B2 | 6/2008 | Wang et al. |
| 7,414,347 B2 | 8/2008 | Wang et al. |
| 7,471,025 B2 | 12/2008 | Sheeran et al. |
| 7,586,231 B2 | 9/2009 | Wang et al. |
| 7,709,992 B2 | 5/2010 | Hussey et al. |
| 7,752,733 B1 | 7/2010 | Badgerow |
| 2001/0006597 A1 | 7/2001 | Neuenschwander |
| 2004/0084988 A1 | 5/2004 | Sheeran et al. |
| 2006/0071569 A1 | 4/2006 | Stewart et al. |
| 2007/0114877 A1 | 5/2007 | Wang et al. |
| 2008/0129142 A1 | 6/2008 | Sheeran et al. |
| 2009/0058206 A1 | 3/2009 | Bremner |
| 2010/0127587 A1 | 5/2010 | Qin et al. |
| 2010/0181853 A1 | 7/2010 | Wong et al. |
| 2011/0037352 A1 | 2/2011 | Lin et al. |
| 2011/0140567 A1 | 6/2011 | Horst et al. |
| 2011/0291519 A1 | 12/2011 | Modi et al. |
| 2012/0161571 A1* | 6/2012 | Fukasaku et al. ............ 310/215 |

FOREIGN PATENT DOCUMENTS

| | | | |
|---|---|---|---|
| JP | S61231868 A | | 10/1986 |
| JP | 09191588 A | * | 7/1997 |
| JP | 2003111329 A | | 4/2003 |
| JP | 2007082276 A | | 3/2007 |
| JP | 2010288405 A | * | 12/2010 |
| JP | 2011135640 A | | 7/2011 |
| KR | 101002958 B1 | | 12/2010 |

OTHER PUBLICATIONS

China First Office Action for related application 201310252692.4 dated Jun. 27, 2016; 10 pp.

* cited by examiner

INSULATION MEMBER FOR USE WITH A STATOR ASSEMBLY AND METHOD OF ASSEMBLING THE STATOR ASSEMBLY

CROSS REFERENCE TO RELATED APPLICATIONS

This application claims priority to U.S. Provisional Application No. 61/624,051 filed Apr. 13, 2012, which is hereby incorporated by reference in its entirety.

BACKGROUND OF THE INVENTION

The embodiments described herein relate generally to an electric machine and, more particularly, to a stator assembly included within the electric machine that includes an insulation member for insulating stator laminations.

In at least some known salient-pole-type electrical machines, a stator core is formed from stator laminations. Magnet wire is wound around portions of the stator core to form stator windings. Insulation members may be used to insulate end turns of the magnet wire from an electric ground. At least some known stator laminations are formed by punching a linear strip of stator teeth from a sheet of stock material. The stator laminations are stacked to form a plurality of stator segments, and the insulation members are positioned such that magnet wire may be wound about the stator segments. The insulation members are configured to provide electrical insulation between the stator laminations and the magnet wire windings.

In at least one known stator assembly, the stator core includes openings configured to receive features included in the end cap. The features are used to secure the end caps to the stator core such that the end caps are properly aligned with stator core teeth. However, the openings in the stator core causes undesirable electromagnetic characteristics.

In at least another known stator assembly, each end cap includes a post or hook that protrudes away from the end cap. A tie-down winds between adjacent stator segments and engages with the hooks of adjacent end caps to hold the adjacent stator segments together during assembly. However, using a tie-down to engage posts of adjacent stator segments does not insulate the stator core from the magnet wire.

In yet another known stator assembly, a piece of plastic insulation is positioned within the slot of a corresponding stator segment. An end cap is positioned around both an end face of the stator core and the plastic insulation such that the plastic insulation is secured to the core. Generally, in these known stator assemblies, the plastic insulation has a thickness that extends into the slot between adjacent stator segments. Furthermore, the end cap in these known embodiments must extend into the slot to secure the plastic insulation to the core. As such, the slot volume available for magnet wire may be significantly reduced. The reduction in slot volume caused by the thick plastic insulation and the width of the end cap may result in an undesirable copper/air ratio. For example, the cooper/air ratio of such known stator assemblies may be approximately 35%.

BRIEF DESCRIPTION OF THE INVENTION

In one aspect, an insulation member for use with a stator assembly is provided. The insulation member includes a body and a cuff. The body includes a first end and an opposite second end. The body also includes at least one tooth portion and at least one yoke portion that extends from the at least one tooth portion. The cuff is formed from at least one of the first end and the second end of the body and extends along at least one of the at least one tooth portion and at least one yoke portion.

In another aspect, a stator assembly including a plurality of stator segments is provided. The stator assembly includes a core, an insulation member, and a wire. The core includes a plurality of teeth that each include at least one end face. The insulation member is positioned between adjacent teeth of the core and includes a body and a cuff. The body includes a first end and an opposite second end. The body also includes at least one tooth portion and at least one yoke portion that extends from the at least one tooth portion. The cuff is formed from at least one of the first end and the second end of the body and extends along at least one of the at least one tooth portion and at least one yoke portion. The wire is wound about at least one of the plurality of teeth such that the insulation member is positioned between the core tooth and the wire.

In yet another aspect, a method of assembling a stator assembly is provided. The stator assembly includes a plurality of stator segments and each stator segment includes at least a portion of a core and at least a portion of an insulation member. The core includes a tooth having at least one end face, and the insulation member includes a body having a first end and an opposite second end, at least one tooth portion, and at least one yoke portion that extends from the at least one tooth portion. The method includes forming a cuff from the insulation member along at least one of the tooth portion and the at least one yoke portion, positioning the at least one insulation member adjacent the core tooth, coupling the cuff to the core tooth, and winding wire about the core tooth such that the at least one tooth portion of the insulation member is positioned between the core tooth and the wire.

DETAILED DESCRIPTION OF THE INVENTION

The methods and systems described herein relate generally to a stator assembly included within an electrical machine. More specifically, the stator assembly includes at least one insulation member that facilitates preventing electrical conductive transfer between wire windings and stator core laminations. Furthermore, the insulation member includes cuffed features that may be used in conjunction with a stator lamination end cap. The cuffed features hold each end cap in a desired position against respective stator laminations until wire has been wound about the stator segment. Alternatively, the end caps may be omitted, and the cuffed features may insulate the stator lamination where the end caps would have been placed.

When the cuffed features are used to hold an end cap in a desired position, they are configured to engage with lip features included with each end cap. The lip features enable the cuffs to latch onto the end cap such that the insulation member and end cap are held in a desired position as wire is wound about each stator segment. However, winding wire about the core laminations may lead to mechanical stress induced upon the end caps and the insulation member. More specifically, the wire applies the greatest amount of mechanical stress at the corners of the stator laminations. In some embodiments, to provide additional strength, the cuffed features are located adjacent areas of the stator laminations that are subject to the greatest mechanical stress.

As mentioned above, the insulation member is configured to hold the end caps in a desired position by engaging the cuffs with lip features formed with the end caps. In addition, the lip features facilitate holding the insulation member in place between adjacent stator segments. As such, the insulation member remains stationary as wire is wound about each stator segment.

In the exemplary embodiments, the insulation member is constructed of a material that facilitates increasing the amount of copper wire that may fit into the slot defined between adjacent stator segments. As compared to known insulation members that are constructed of plastic materials, embodiments of the present insulation member are thinner such that either more copper wire of the same gauge or larger-gauge copper wire, may be wound about each stator segment. Implementing more wire or larger gauge stator wire facilitates improving electromagnetic characteristics of the stator assembly. As such, embodiments of the present invention may increase the copper/air ratio by up to approximately 54%.

Figure 1:
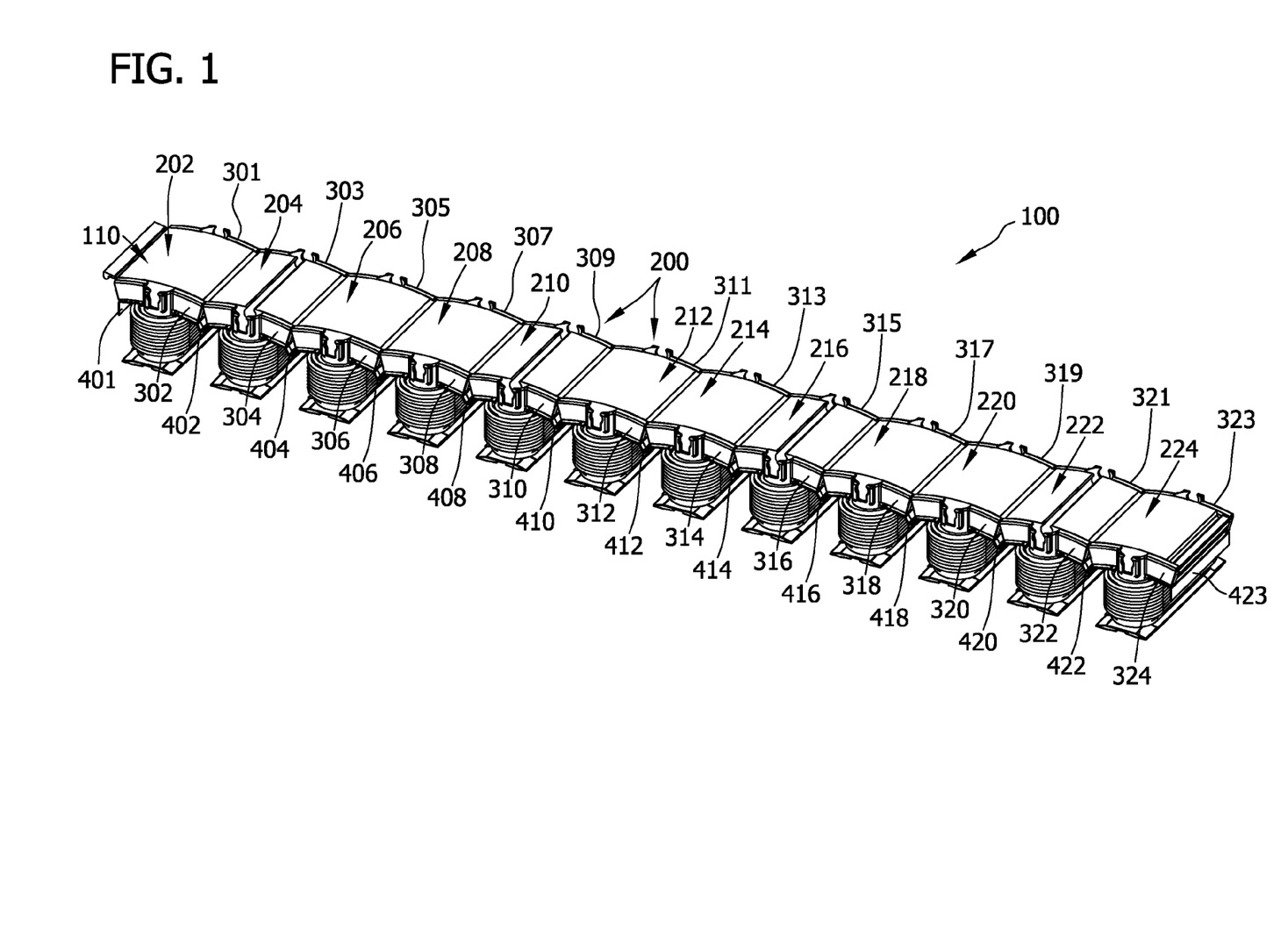
FIG. 1 is a perspective view of an exemplary stator assembly.

FIG. 1 is a perspective view of an exemplary stator assembly 100. In the exemplary embodiment, stator assembly 100 is configured for use in, for example, a brushless direct current motor, a permanent magnet alternating current (PMAC) motor, and/or any other suitable electrical machine. In the exemplary embodiment, stator assembly 100 includes a stator core 110, a plurality of end caps 300, and a plurality of insulation members 400. Stator assembly 100 may include a plurality of stator segments 200, for example, a first stator segment 202, a second stator segment 204, a third stator segment 206, a fourth stator segment 208, a fifth stator segment 210, a sixth stator segment 212, a seventh stator segment 214, an eighth stator segment 216, a ninth stator segment 218, a tenth stator segment 220, an eleventh stator segment 222, and a twelfth stator segment 224. Although illustrated as including twelve stator segments, stator assembly 100 may include any suitable number of stator segments such that stator assembly 100 functions as described herein.

In some embodiments, core 110 may be formed as a stack of flat laminations (not shown) made of a highly magnetically permeable material, or core 110 may be a solid core. The plurality of laminations that form core 110 may be either interlocked or loose.

In some embodiments, the plurality of end caps 300 includes first end caps 301, 303, 305, 307, 309, 311, 313, 315, 317, 319, 321, and 323, and second end caps 302, 304, 306, 308, 310, 312, 314, 316, 318, 320, 322, and 324. In the exemplary embodiment, each stator segment includes a first end cap and a second end cap. For example, third stator segment 206 includes first end cap 305 and second end cap 306, fourth stator segment 208 includes first end cap 307 and second end cap 308, fifth stator segment 210 includes first end cap 309 and second end cap 310, and sixth stator segment 212 includes first end cap 311 and second end cap 312. Furthermore, in some embodiments, the plurality of insulation members 400 includes insulation members 402, 404, 406, 408, 410, 412, 414, 416, 418, 420, and 422.

Figure 2:
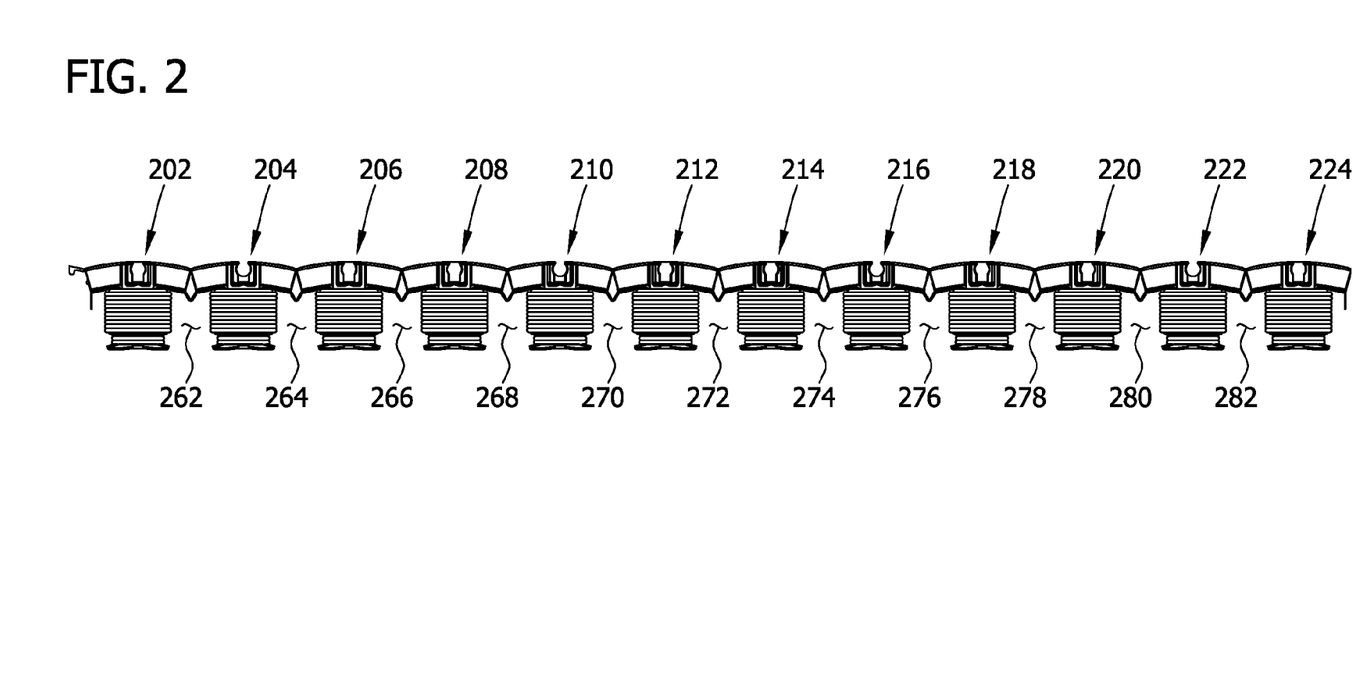
FIG. 2 is a perspective front view of the stator assembly shown in FIG. 1.

FIG. 2 is a perspective front view of stator assembly 100. In the exemplary embodiment, a plurality of slots are defined between adjacent stator segments 200. For example, a first slot 262 is defined between stator segments 202 and 204, a second slot 264 is defined between stator segments 204 and 206, a third slot 266 is defined between stator segments 206 and 208, a fourth slot 268 is defined between stator segments 208 and 210, a fifth slot 270 is defined between stator segments 210 and 212, a sixth slot 272 is defined between stator segments 212 and 214, a seventh slot 274 is defined between stator segments 214 and 216, an eighth slot 276 is defined between stator segments 216 and 218, a ninth slot 278 is defined between stator segments 218 and 220, a tenth slot 280 is defined between stator segments 220 and 222, and an eleventh slot 282 is defined between stator segments 222 and 224. Accordingly, as explained in more detail below, an insulation member 400 may be positioned within each slot to substantially insulate core 110.

Figure 3:
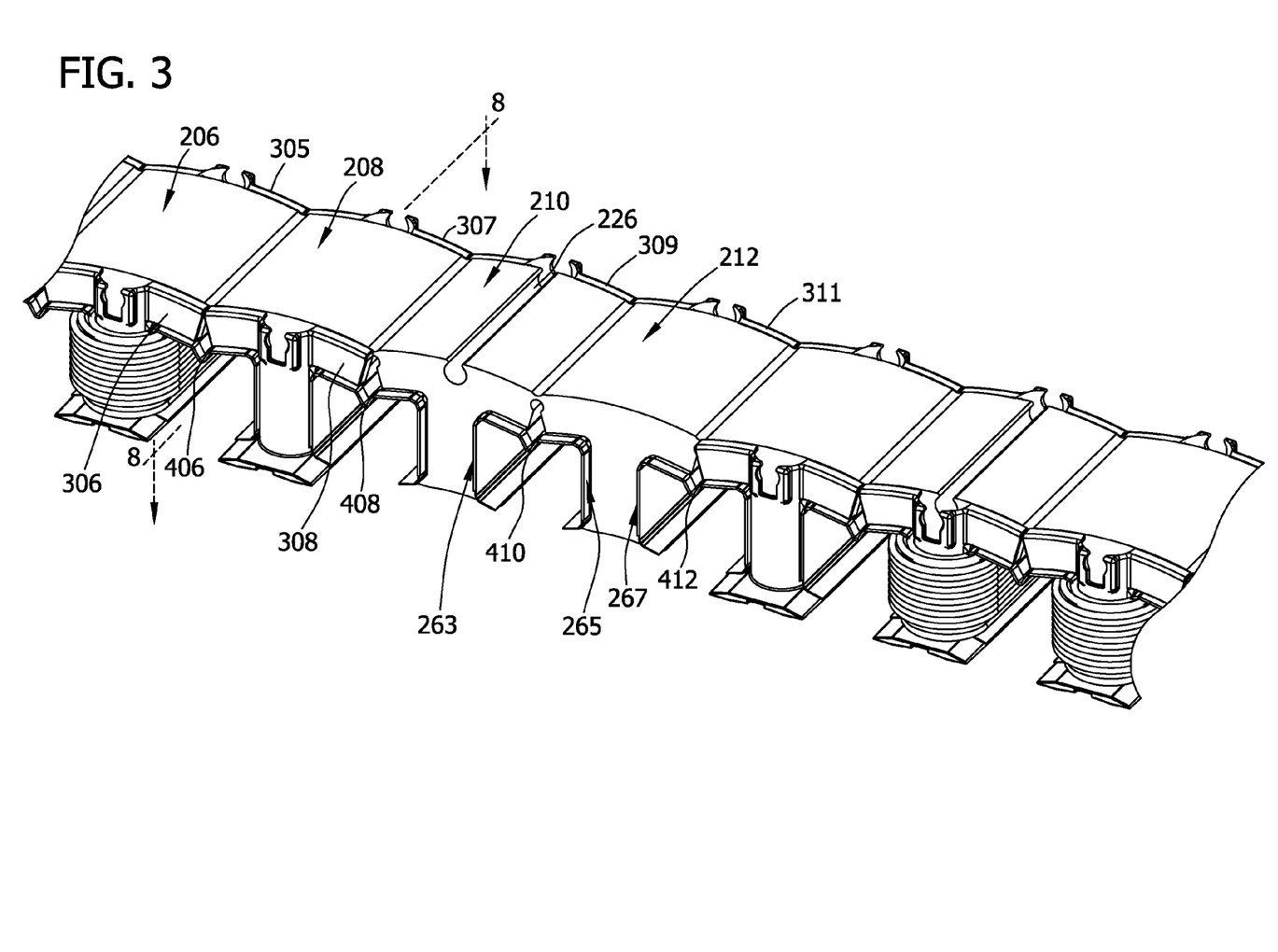
FIG. 3 is a close-up perspective view of the stator assembly shown in FIG. 1.
Figure 4:
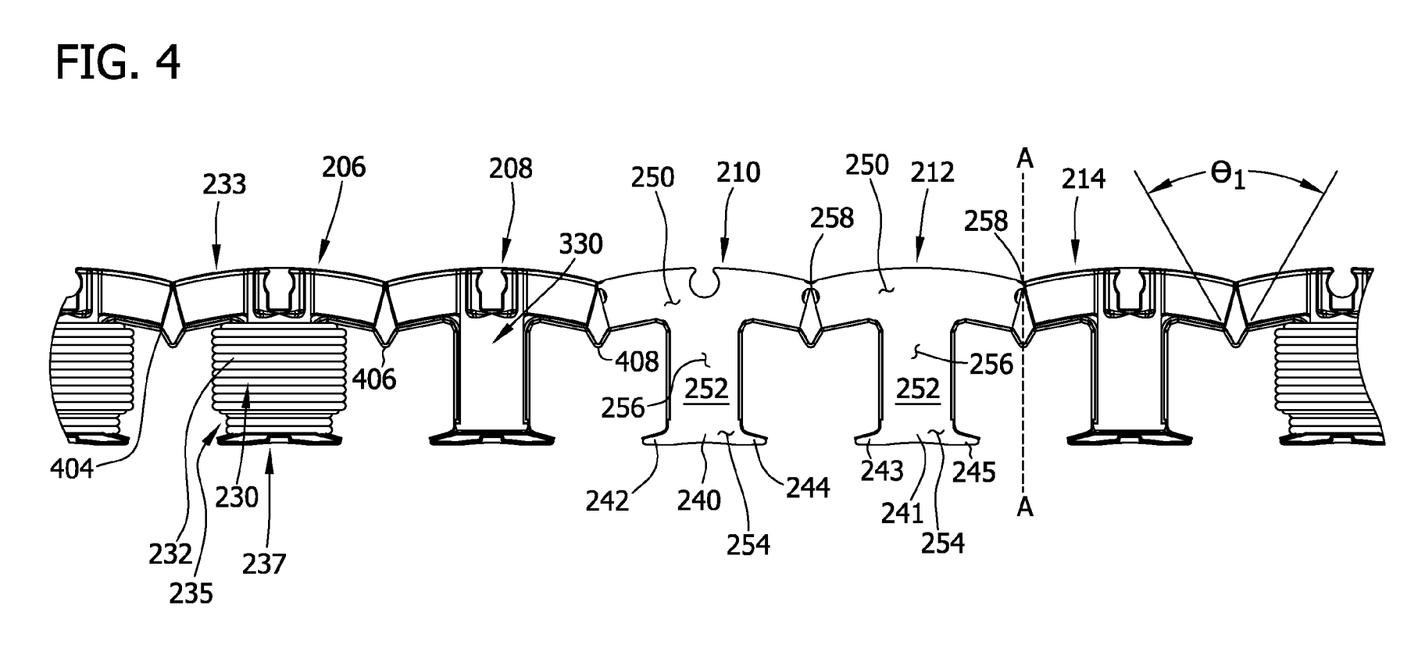
FIG. 4 is a close-up front view of the stator assembly shown in FIG. 2.

FIG. 3 is a close-up perspective view of stator assembly 100 and FIG. 4 is a close-up front view of stator assembly 100. It should be understood that end caps 310 and 312 have been removed for illustrative purposes only. In the exemplary embodiments, core 110 includes a plurality of yokes 250, a plurality of feet 254, and a plurality of teeth 252 extending therebetween. More specifically, for example, a portion of core 110 of fifth stator segment 210 includes a foot 240 having a first portion 242 and a second portion 244 extending from tooth 252 of stator segment 210, and a portion of core 110 of sixth stator segment 212 includes a foot 241 having a first portion 243 and a second portion 245 extending from tooth 252 of stator segment 212. In some embodiments, at least one of the plurality of stator segments 200 includes a through-bore 226 for receiving a through-bolt (not shown). In one embodiment, every third stator segment (e.g. stator segments 204, 210, 216, and 222) includes through-bore 226 defined within respective yokes 250. Core 110 also includes a plurality of flexible portions 258 that connect adjacent yokes 250 and are configured to enable stator assembly 100 to be arranged annularly.

Furthermore, in the exemplary embodiment, one of the plurality of insulation members 400 is positioned within the slots defined between adjacent stator segments 200. More specifically, insulation members 400 are positioned between adjacent teeth 252 of core 110. In one embodiment, insulation member 410 extends along core foot portion 244 of stator segment 210, along core tooth 252 of stator segment 210, along core yoke 250 of stator segment 210, along core yoke 250 of stator segment 212, along core tooth 252 of stator segment 212, and along core foot portion 243 of stator segment 212. As such, insulation member 410 spans slot 270 defined between stator segments 210 and 212.

In some embodiments, insulation members 400 are coupled to end caps 300. For example, in the exemplary embodiment, insulation member 406 is coupled to first end caps 305 and 307, and to second end caps 306 and 308 such that each end cap 300 is positioned between an end face 256 of core 110 and winding 230. As such, portions of insulation members 404 and 406 and end caps 300 are positioned between tooth 252 and winding 230 to substantially insulate core 110.

More specifically, and using stator segment 206 for example, end caps 305 and 306 and insulation members 404 and 406 are configured to substantially cover exposed laminations of core 110 of stator segment 206. In some embodiments, end caps 305 and 306 and insulation members 404 and 406 are positioned adjacent to and insulate core tooth 252 from windings 230. In the exemplary embodiment, wire 232 is wound about core tooth 252 to form windings 230 such that end caps 305 and 306, a tooth portion 434 (shown in FIG. 7) of insulation member 406, and a tooth portion 444 (shown in FIG. 7) of insulation member 404 are positioned between core tooth 252 and wire 232. Accordingly, windings 230 extend at least partially into slots 264 and 266 and end caps 305 and 306 are shaped such that they do not extend into slots 264 and 266. Furthermore, in some embodiments, windings 230 may be positioned between yoke 250 and foot 254 of stator segment 206.

Figure 5:
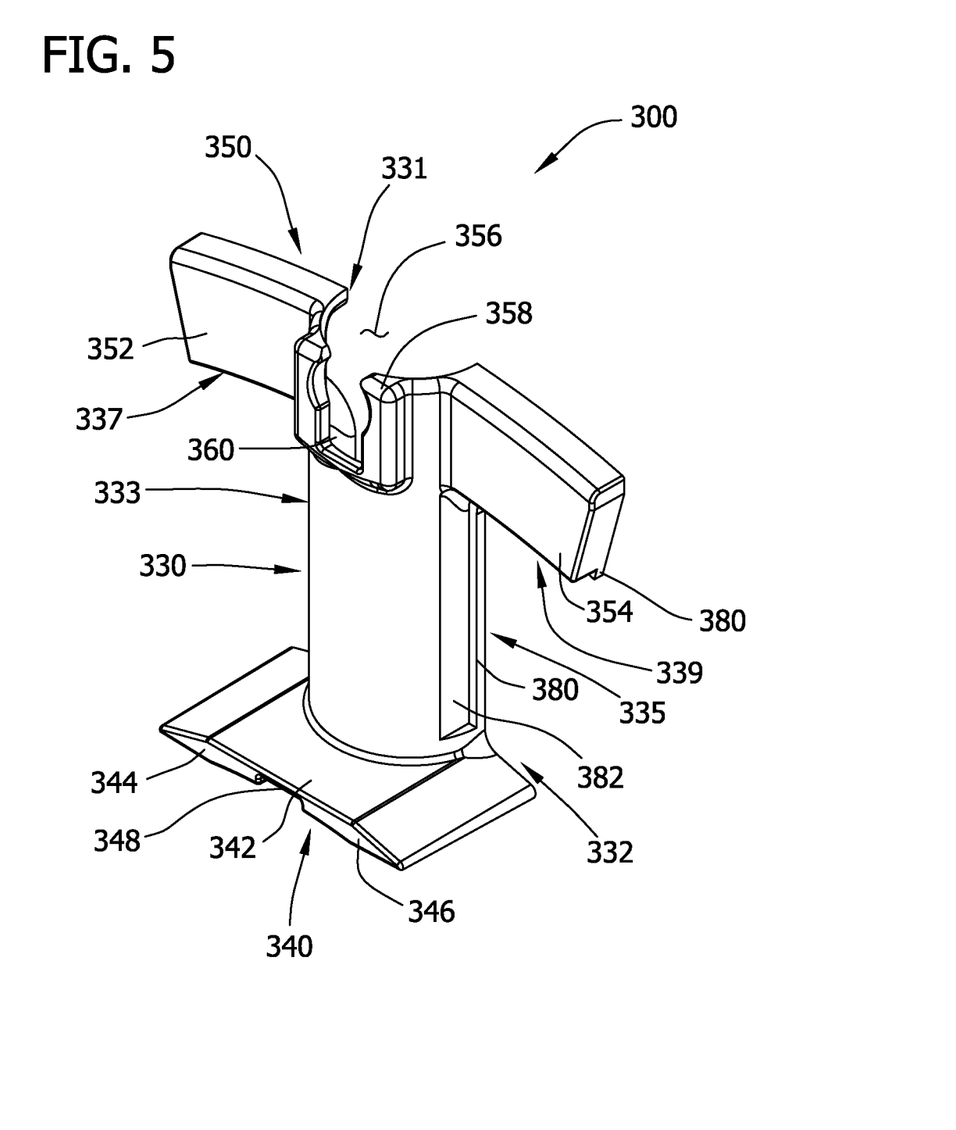
FIG. 5 is perspective view of an exemplary end cap that may be included in the stator assembly shown in FIG. 1.
Figure 6:
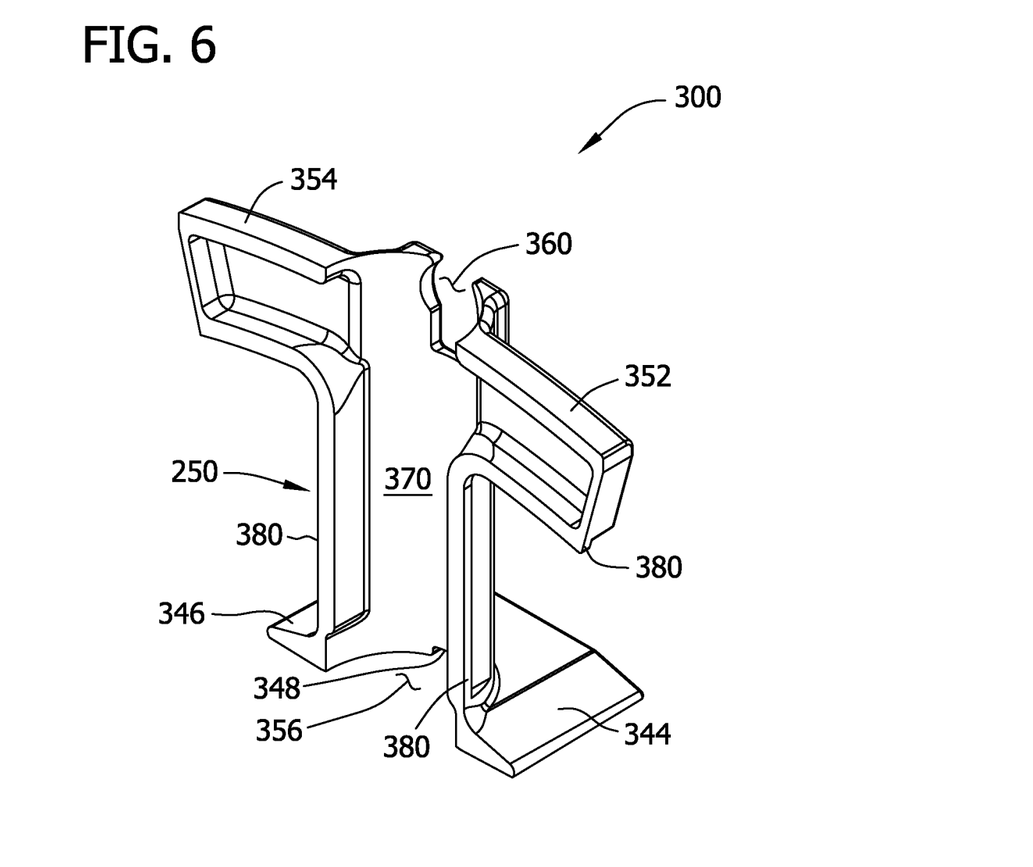
FIG. 6 is a perspective view of a second side of the end cap shown in FIG. 5.

FIGS. 5 and 6 are perspective views of end cap 300. In the exemplary embodiment, end cap 300 includes a tooth portion 330, a yoke portion 350 formed at a first end 331 of tooth portion 330, and a foot portion 340 formed at a second end 332 of tooth portion 330. Tooth portion may have any suitable shape that enables stator assembly 100 to function as described herein. For example, tooth portion 330 may have a substantially cylindrical shape that defines a semi-cylindrical cavity 356 formed therein. Furthermore, cavity 356 extends the length of tooth portion 330 from first end 331 to second end 332. Yoke portion 350 includes a first arm portion 352 that extends from tooth portion 330, a second arm portion 354 that extends from tooth portion 330, and a central portion 358 defined therebetween. In the exemplary embodiment, fastener aperture 360 is defined in central portion 358. Foot portion 340 includes a central portion 342 that is substantially rectangular in shape and oriented substantially perpendicularly to tooth portion 330. Foot portion 340 also includes a first portion 344 extending from tooth portion 330 and central portion 342, and a second portion 346 extending from tooth portion 330 and central portion 342. First portion 344 has a shape that corresponds to a shape of core foot first portion 242 (shown in FIG. 3), and second portion 346 has a shape that corresponds to a shape of core foot second portion 244 (shown in FIG. 3).

In some embodiments, a first fastening feature is included within end cap 300. For example, in the exemplary embodiment, end cap 300 includes at least one lip 380 defined along at least one of tooth portion 330 and one or both of first portion 352 and second portion 354 of yoke portion 350. In the exemplary embodiment, lip 380 extends at least partially along a first side 333 of tooth portion 330 and a second side 335 of tooth portion 330, and at least partially along a first side 337 of yoke portion 350 and a second side 339 of yoke portion 350. In one embodiment, lip 380 may extend along first and second portions 344 and 346 of foot 340. In another embodiment, lip 380 may extend at least partially along any combination of first and second sides 333 and 335 of tooth portion 330, and first and second sides 337 and 339 of yoke portion 350. Furthermore, in the exemplary embodiment, end cap 300 includes an indentation 382 defined within tooth portion 330 and arm portions 352 and 354. Indentation 382 is located on the outer edges of tooth portion 330 and arm portions 352 and 354 such that lip 380 is defined by indentation 382. Furthermore, as mentioned above, lip 380 of end caps 300 are configured such that they do not extend into and/or reduce the area of slots 262, 264, 266, 268, 270, 272, 274, 276, 278, 280, and 282.

End cap 300 may be constructed from any suitable material that enables end cap 300 to function as described herein. More specifically, end cap 300 may be constructed of any suitable non-conductive material. For example, end cap 300 may be constructed of, but is not limited to, Valox® DR51M ("Valox" is a registered trademark of Sabic Innovative Plastics of Bergen op Zoom, Netherlands).

Figure 7:
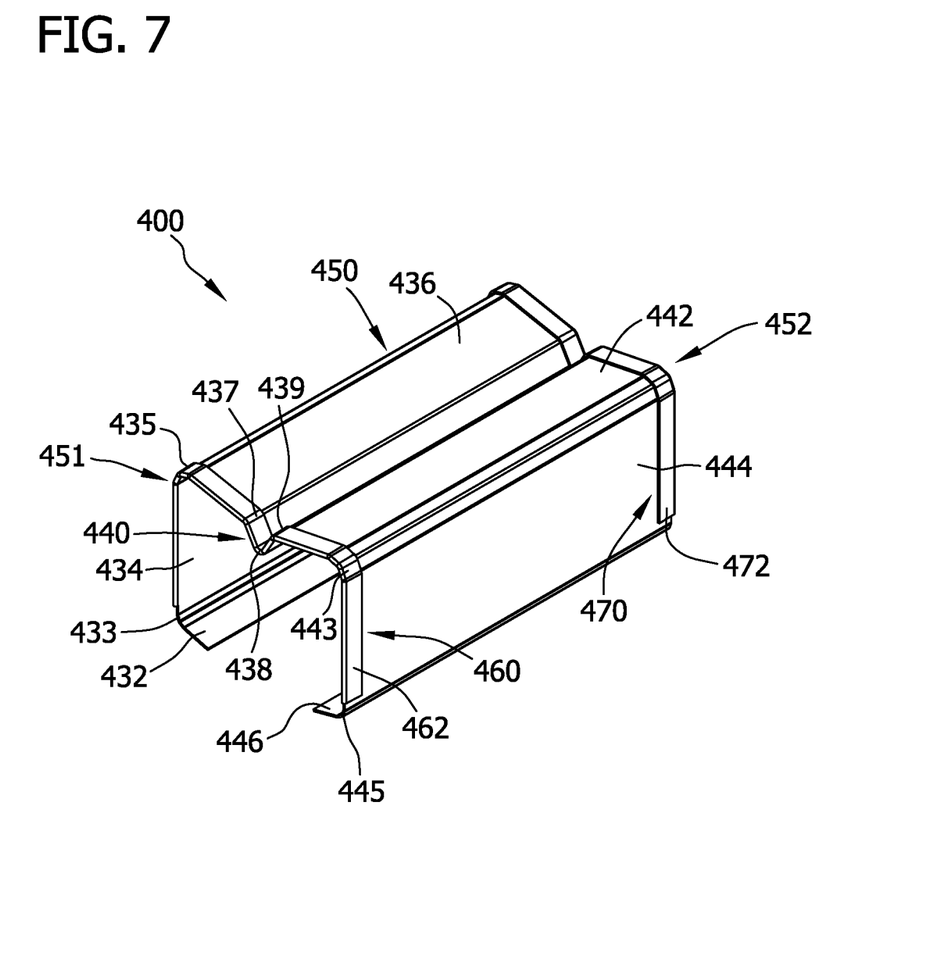
FIG. 7 is a perspective view of an exemplary insulation member that may be included in the stator assembly shown in FIG. 1.

FIG. 7 is a perspective view of insulation member 400 that, in one embodiment, is be included with stator assembly 100 (shown in FIG. 1). Each insulation member 400 of stator assembly 100 is substantially the same and, as such, one insulation member 400 is described in detail herein.

Insulation member 400 may be formed from any suitable electrically insulated film or sheet material that enables insulation member 400 to function as described herein. For example, in some embodiments, insulation member 400 may be formed from a sheet of $1/1000^{th}$ inch-thickness paper, a thermoplastic material, a thermoset materials, a Dacron/Mylar/Dacron (DMD) material, and TufQUIN® having a thickness of at least 0.002 inch. In the exemplary embodiment, insulation member 400 is formed from a sheet of Mylar® polyester film ("Mylar" is a registered trademark of E. I. du Pont de Nemours and Company of Wilmington, Del.) and is substantially symmetrical with respect to a vertical plane A (shown in FIG. 3). In some embodiments, insulation member 400 formed from a sheet of Mylar® polyester film has a thickness of 0.005 inch to about 0.01 inch.

In the exemplary embodiment, insulation member 400 includes, in continuous series, a first foot portion 432, a first tooth portion 434, a first yoke portion 436, a connection portion 440, a second yoke portion 442, a second tooth portion 444, and a second foot portion 446. A first bend 433 is defined between first foot portion 432 and first tooth portion 434, a second bend 435 is defined between first tooth portion 434 and first yoke portion 436, a third bend 437 is defined between first yoke portion 436 and connection portion 440, a fourth bend 438 is defined within connection portion 440, a fifth bend 439 is defined between connection portion 440 and second yoke portion 442, a sixth bend 443 is defined between second yoke portion 442 and second tooth portion 444, and a seventh bend 445 is defined between second tooth portion 444 and second foot portion 446. Alternatively, insulation member 400 has any suitable shape that corresponds to the shape of slots 262, 264, 266, 268, 270, 272, 274, 276, 278, 280, and 282. Furthermore, alternatively, insulation members 401 and 423 (shown in FIG. 1) at the ends of stator assembly 100 are each a truncated insulation member 401 and 423, such as half of an insulation member 400.

Insulation member 400 is configured to substantially insulate core 110 of each stator segment 200 from winding 230. More specifically, tooth portions 434 and 444, yoke portions 436 and 442, and foot portions 432 and 446 are configured to insulate core 110 from winding 230. Although stator segment 212 will be described in more detail below, the following description may apply to any one of stator segments 200. In the exemplary embodiment, foot portion 432, tooth portion 434, and yoke portion 436 of insulation member 412 substantially cover surface 267 of stator segment 212, and foot portion 446, tooth portion 444, and yoke portion 442 of insulation member 410 substantially covers surface 265 of stator segment 212. In some embodiments, foot portion 432 of insulation member 412 extends past second portion 245 of foot 241 into slot 268, and foot portion 446 of insulation member 410 extends past first portion 243 of foot 241 into slot 266 to substantially insulate first and second portions 243 and 245 of foot 241. Foot portions 432 and 446 may then bend around first and second portions 243 and 245 of foot 241.

Connection portion 440 of insulation member 400 is configured to enable stator assembly 100 to be arranged in a substantially linear orientation and subsequently formed into an annular arrangement to a form a stator ring. Connection portion 440 facilitates forming stator assembly 100 into a stator ring by providing additional insulation material that flexes as the plurality of stator segments 200 are bent into the annular arrangement. More specifically, connection portion 440 includes an angle $\theta_1$ (shown in FIG. 3) that is from about 15° to about 45° when stator assembly 100 is arranged linearly. When stator assembly 100 is bent into the annular arrangement to form the stator ring, fourth bend 438 flexes such that $\theta_1$ becomes a more acute angle. For example, when stator assembly 100 is arranged annularly, angle $\theta_1$ is approximately 0°. In some embodiments, angle $\theta_1$ is dependent on the number of stator segments 200 in stator assembly 100. For example, angle $\theta_1$ is greater in a stator assembly including fewer stator segments, and angle $\theta_1$ is smaller in a stator assembly including more stator segments 200. The difference in angle $\theta_1$ is dependent on the degree in which connection portion 440 must bend when stator assembly 100 is arranged annularly to form a stator ring.

Insulation member 400 also includes a second fastening feature configured to engage the first fastening feature of end cap 300. In the exemplary embodiment, insulation member 400 includes a body 450 having a first end 451 and a second end 452. The second fastening feature includes a first flap 462 extending from first end 451 of body 450 and a second flap 472 extending from second end 452 of body 450. First flap 462 is configured to form a first cuff 460 at first end 451, and second flap 472 is configured to form a second cuff 470 at second end 452. In the exemplary embodiment, cuffs 460 and 470 extend along tooth portion 434, yoke portion 436, connection portion 440, yoke portion 442, and tooth portion 444. In an alternative embodiment, cuffs 460 and 470 may extend along foot portions 432 and 446 such that cuffs 460 and 470 engage with lip 380 that extends along first and second portions 344 and 348 of foot 340. Flaps 462 and 472 and cuffs 460 and 470 are substantially similar and, as such, first flap 462 and first cuff 460 are described in more detail below. However, it should be understood that such a description may also apply to second flap 472 and second cuff 470.

Figure 8:
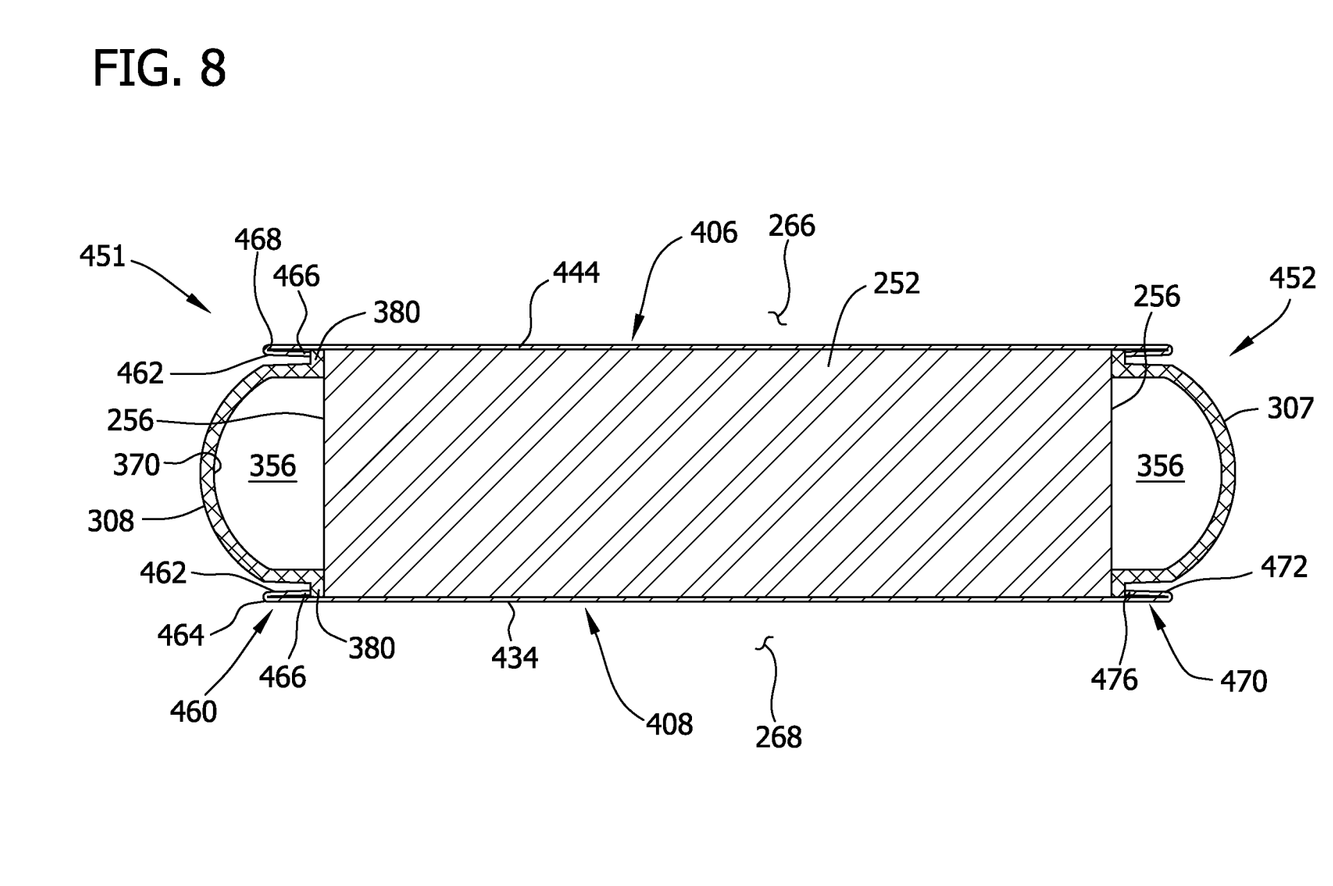
FIG. 8 is a cross-sectional view of the stator assembly shown in FIG. 3 taken at line 8-8.

FIG. 8 is a cross-sectional view of fourth stator segment 208 taken at line 8-8. In the exemplary embodiment cuff 460 includes flap 462 that extends from first end 451 and is folded over body 450. As such, a crease 468 is formed between flap 462 and body 450 at first end 451. Crease 468 may be oriented such that flap 462 is positioned a distance from body 450, or flap 462 may be oriented such that an end 466 of flap 462 contacts body 450. In the exemplary embodiment, cuff 460 is not formed along foot portions 432 and 446. In an alternative embodiment, flap 462 extends along body 450 at any suitable portions of insulation member 400. Furthermore, in the exemplary embodiment, when flap 462 is folded over body 450, flap 462 extends along at least a portion of the length of body 450, the length being between first end 451 and second end 452.

Furthermore, in the exemplary embodiment, end caps 307 and 308 are positioned adjacent to each end face 256 of core 110 such that cavity 356 is defined between an inner surface 370 of each end cap 307 and 308 and each end face 256. First cuff 460 couples to lip 380 of first end cap 308 to secure insulation members 406 and 408 to end cap 308 and end face 256. More specifically, end 466 of flap 462 contacts lip 380. Cuff 460 can flex at bend 464 to increase a distance between end 466 and body 450 to facilitate coupling insulation member 400 to end cap 308 and/or to tooth 252 (shown in FIG. 4). When coupled to end caps 307 and 308 and/or tooth 252, cuffs 460 and 470 secure insulation members 400 in place as wire 232 is wound about core tooth 252 to form winding 230 (shown in FIG. 4).

In an alternative embodiment, end caps 307 and 308 may be omitted such that ends 466 and 476 of insulation members 406 and 408 contact each end face 256 of core 110. More specifically, core 110 may be positioned between cuffs 460 and 470. Wire 232 may then be wound about tooth assembly 236 such that cuffs 460 and 470 substantially insulate each end face 256 from winding 230.

The insulation member described herein facilitates insulating a stator core from electrical conductivity. The insulation member has a reduced thickness when compared to known insulations. The reduced thickness of the insulation member increases the area of a slot defined between adjacent stator segments. The increased slot area may accommodate insertion of either more copper wire of the same gauge or insertion of larger-gauge copper wire. Inserting more copper wire or larger-gauge copper wire increases the output current of the stator assembly. Furthermore, the insulation member described herein includes at least one cuff feature that facilitates coupling an end cap to a stator core. As such, the end cap remains stationary to facilitate assembling the stator assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly including a plurality of stator segments, the stator assembly comprising:
   a core comprising a plurality of teeth and at least one end face;
   an insulation member positioned between adjacent teeth of said core, said insulation member comprising:
      a body including a first end and an opposite second end, said body comprising at least one tooth portion, a first yoke portion that extends from said at least one tooth portion, a second yoke portion, and a connection portion extending between said first and second yoke portions; and
      a cuff formed from at least one of the first end and the second end of said body, said cuff extending along at least one of said at least one tooth portion and said at least one yoke portion, wherein said cuff comprises a flap folded over said body defining a bent portion of said cuff, the bent portion extending continuously along said at least one tooth portion, said first and second yoke portions, and said connection portion, and wherein said insulation member is positioned such that a tip of said flap is spaced a distance from said at least one end face; and an end cap coupled to said at least one end face, wherein at least a portion of said end cap is positioned in the spaced distance between said at least one end face and said tip of said flap; and a wire wound about at least one of said plurality of teeth such that said insulation member is positioned between said core tooth and said wire.

2. The stator assembly in accordance with claim 1, wherein said body comprises a first tooth portion and a second tooth portion, said at least one yoke portion extending between said first and second tooth portions.

3. The stator assembly in accordance with claim 1, wherein said cuff is formed from only said at least one tooth portion, said first yoke portion, said second yoke portion and said connection portion.

4. The stator assembly in accordance with claim 1, wherein said flap extends along at least a portion of a length of said body.

5. The stator assembly in accordance with claim 1, wherein said insulation member comprises at least one of a polyester material and a paper material.

6. The stator assembly in accordance with claim 5, wherein the paper material has a thickness of approximately 0.001 inches.

7. The stator assembly in accordance with claim 5, wherein the polyester material has a thickness of approximately 0.01 inches.

8. The stator assembly in accordance with claim 1, wherein said connection portion comprises a first bend, a second bend, and a third bend.

9. The stator assembly in accordance with claim 8, wherein an angle of said connection portion is defined at the second bend, the angle from about 15° to about 45° when the plurality of stator segments are arranged linearly.

10. The stator assembly in accordance with claim 9, wherein the angle is approximately 0° when the plurality of stator segments are arranged annularly.

11. The stator assembly in accordance with claim 1, wherein said insulation member body comprises a foot portion extending from said at least one tooth portion, said foot portion configured to retain said wire therein.

12. A method of assembling a stator assembly including a plurality of stator segments, each stator segment including at least a portion of a core, at least a portion of an end cap, and at least a portion of an insulation member, wherein the core includes a tooth having at least one end face, the insulation member including a body having a first end and an opposite second end, at least one tooth portion, a first yoke portion that extends from the at least one tooth portion, a second yoke portion, and a connection portion extending between the first and second yoke portions, said method comprising:

forming a cuff from the insulation member along at least one of the tooth portion and the at least one yoke portion, wherein forming the cuff includes folding a flap over the body defining a bent portion of the cuff, the bent portion extending continuously along the at least one tooth portion, the first and second yoke portions, and the connection portion;

positioning the at least one insulation member such that a tip of the flap is spaced from the at least one end face, and such that the portion of the end cap is positioned between the at least one end face and the tip of the flap; and winding wire about the core tooth such that the at least one tooth portion of the insulation member is positioned between the core tooth and the wire.

13. The method in accordance with claim 12, wherein forming a cuff further comprises:

extending the flap from at least one of the first end and the second end of the body; and folding the flap over the body.

14. The method in accordance with claim 13, wherein forming a cuff further comprises extending the flap from each of the first end and the second end of the body such that the core tooth is positioned between the cuffs formed from each respective flap.

15. The method in accordance with claim 12, wherein positioning the at least one insulation member further comprises positioning the at least one insulation member to extend between adjacent teeth of the core such that the insulation member spans across a slot defined between the adjacent teeth.

16. The method in accordance with claim 12 further comprising arranging a plurality of the stator segments annularly to form a stator ring.

* * * * *